United States Patent

Kato

[11] Patent Number: 5,975,284
[45] Date of Patent: Nov. 2, 1999

[54] CARRIER APPARATUS

[75] Inventor: Heizaburo Kato, Shizuoka, Japan

[73] Assignee: Sankyo Manufacturing Co., Ltd., Tokyo, Japan

[21] Appl. No.: 08/964,099

[22] Filed: Nov. 6, 1997

[30] Foreign Application Priority Data

Nov. 11, 1996 [JP] Japan ................................. 8-298952

[51] Int. Cl.⁶ .......................................... B65G 25/00
[52] U.S. Cl. ............................... 198/621.1; 72/405.13
[58] Field of Search ..................... 198/621.1; 414/740, 414/741, 751; 72/405.09, 405.11, 405.13

[56] References Cited

U.S. PATENT DOCUMENTS 3,620,381 11/1971 McCaughey .......................... 198/621.1
4,012,937 3/1977 Imanishi ................................ 72/405.13

FOREIGN PATENT DOCUMENTS 49-42752 11/1974 Japan.
6-16365 4/1994 Japan.

Primary Examiner—Joseph E. Valenza
Assistant Examiner—Gene O. Crawford
Attorney, Agent, or Firm—Morrison & Foerster LLP

[57] ABSTRACT

The present invention relates to a carrier apparatus for clamping a work by a two-dimensional rectangular motion of a pair of feed bars to automatically carry the work linearly. The carrier apparatus has at least three cams for feed and clamp rotated by an input shaft. Each of the rotational motions of these cams is transmitted to a pair of bars in parallel through the paired turrets and paired motion conversion mechanisms in the form of rectangular motions. These rectangular motions in the both feed bars are applied to the clamping motion and the feed motion for carrying the work.

12 Claims, 9 Drawing Sheets

CARRIER APPARATUS

BACKGROUND OF THE INVENTION

1. Field of the Invention

The present invention relates to a carrier apparatus for clamping a work by a two-dimensional rectangular motion of a pair of feed bars to automatically carry the work linearly.

2. Related Art

In a transfer press, there is used a transfer apparatus adapted to automatically carry out the carrying of a work for achieving the labor saving. In this transfer apparatus, a series of operations are carried out which comprising gripping and feeding a work, and releasing it at a position as required by a two-dimensional rectangular motion performed by a pair of feed bars arranged in parallel. In the above-described carrier apparatus, a mechanism for causing the feed bars to effect the rectangular motion is classified into a mechanical system comprising a planet gear, a link, a cam or the like and driven from a driving source of the press, and an independent driving system for independently carrying out each linear motion making use of a servo motor, a cylinder or the like.

However, in the conventional carrier apparatuses described above, in the independent driving system, the apparatus is driven by a driving source such as a servo motor, a cylinder or the like completely independent of a driving source of the press. Therefore, it requires a difficult control such that the servomotor or the cylinder is operated in synchronism with processes of the press. For this reason, in the case where the press is operated at high speeds, it is necessary to operate the carrier apparatus at high speeds to speed up the carrying speed accordingly. However, technical means of high degree is necessary to eliminate even a slight deviation in synchronizing them, and adjustments with high accuracy are necessary, making it very difficult to effect the continuous operation smoothly for a long period of time.

On the other hand, in the mechanical type carrier apparatus, since it is driven by a driving source of the press, the operation of the press can be positively synchronized with the carrier operation of a work. As a typical transfer driving mechanism of the mechanical system, a mechanism using a planet gear has been known, in which the rotation of the driving shaft of the press body is transmitted to a planet gear inscribed with a sun gear through the sun gear within a transfer unit. The planet gear is provided with an eccentric pin, and the locus of the pin is used as a transfer feed amount. In the clamp and unclamp motion of a work, an opening and closing mechanism of feed bars is driven in a manner such that a rack and pinion is rotated by a plate cam mounted on the side of the slide through a link in contact with the cam.

However, the above-described mechanical system has various problems in that the construction is materially complicated in which a turning force input from the press is converted into a series of operations of gripping, feeding and releasing the work; the number of constituent parts considerably increases so that the entire apparatus increases in size and the cost of apparatus increases; and since the construction is complicated, it is difficult to secure the operation at high speeds.

SUMMARY OF THE INVENTION

In view of the above-described problems with respect to prior art, the object of the present invention is to provide a carrier apparatus, in which a series of operations of gripping, feeding and releasing for carrying a work in a linear direction is achieved by the input from a single driving source, and the entire apparatus can be made compact as well as realization of high speed operation.

For achieving the aforementioned object, a carrier apparatus according to the present invention comprises an input shaft in which a rotational driving force is input; a pair of feed bars arranged in parallel with each other, capable of being reciprocated in a direction of moving close to and away from each other and in a direction orthogonal thereto, and each feed bar carrying out a rectangular motion; at least three cams, of which at least one cam is the one for either of feed or clamp while at least two cams are the ones for the other, being coaxially provided on the input shaft integrally rotatably, and being formed with each of cam shapes with a point symmetry of 180-degree angles around a rotational axis thereof; a pair of turrets for feed engaged with the cams for feed at a symmetrical position of 180-degree angles with the cam sandwiched therebetween, and converting the rotation of the input shaft into the rocking rotations; a pair of turrets for clamp engaged with the cams for clamp at a symmetrical position of 180-degree angles with the cams sandwiched therebetween, and converting the rotation of the input shaft into the rocking rotations in a direction orthogonal to the direction of the rocking rotations of the turrets for feed; a feed motion conversion mechanism provided between the turrets for feed and the feed bars to convert the rocking rotation of each turret for feed into the feed motion of each feed bar; and a clamp motion conversion mechanism provided between the turrets for clamp and the feed bars to convert the rocking rotation of each turret for clamp into the clamp motion of each feed bars; wherein a work is clamped by the clamp motion of the feed bars, and thus the clamped work is carried by the feed motion of the feed bars.

Further, there is provided an arrangement wherein the cam for feed is provided one, the cams for clamp are provided two, and the turrets for feed are provided two and disposed on the cam for feed with the latter sandwiched therebetween, the turrets for clamp are provided four and disposed on each cam for clamp with the latter sandwiched therebetween, and each turret for feed is connected to each feed bar through the feed motion conversion mechanism, and the turrets for clamp paired on the same side with respect to the cams for clamp are connected to each feed bar through the clamp motion conversion mechanism.

On the other hand, there is provided an arrangement wherein the cams for feed are provided two, the cam for clamp is provided one, and the turrets for feed are provided four and disposed on each cam for feed with the latter sandwiched therebetween, the turrets for clamp are provided two and disposed on the cam for clamp with the latter sandwiched therebetween, and the turrets for feed paired on the same side with respect to the cams for feed are connected to each feed bar through the feed motion conversion mechanism, and each turret for clamp is connected to each feed bar through the clamp motion conversion mechanism.

The feed motion conversion mechanism comprises a pair of moving tables individually mounted on each feed bar, grooves for feed formed in each moving table along the direction of the feed bars moving close to and away from each other, rocking arms for feed provided on each turret for feed, and sliders provided on each rocking arm for feed and disposed slidably in each groove for feed.

The clamp motion conversion mechanism comprises a pair of moving tables individually mounted on each feed bar, grooves for clamp formed in each moving table along a direction orthogonal to the direction of the feed bars moving close to and away from each other, rocking arms for clamp provided on each turret for clamp, and sliders provided on each rocking arm for clamp and disposed slidably in each groove for clamp.

Each of the feed bars is provided with a plurality of clamp pawls for clamping the work in opposed portions opposed to each other, and the clamp pawls are located at fixed intervals corresponding to the rocking rotational angle of the turrets for feed.

For alternately generating the feed motion and the clamp motion, the cam shape for feed is so set as to stop the turrets for feed during the rocking rotations of the turrets for clamp, and the cam shape for clamp is so set as to stop the turrets for clamp during the rocking rotations of the turrets for feed.

Alternatively, for overlapping the feed motion and the clamp motion, the cam shapes for feed and for clamp are so set as to rock and rotate the turrets for feed during the rocking rotations of the turrets for clamp.

Further, the rotational driving force is input into the input shaft from the mechanical apparatus to which the carrier apparatus is applied.

Each of the feed bars and each of the moving tables individually provided the respective feed bars are integrally formed.

Further, a carrier apparatus according to the present invention comprises an input shaft in which a rotational driving force is input from a mechanical apparatus to which the carrier apparatus is applied; a pair of feed bars arranged in parallel with each other, capable of being reciprocated in a direction of moving close to and away from each other and in a direction orthogonal thereto, and each feed bar carrying out a rectangular motion; one cam for feed coaxially provided on the input shaft integrally rotatably and being formed with a cam shape with a point symmetry of 180-degree angles around a rotational axis thereof; two cams for clamp coaxially provided on the input shaft integrally rotatably and being formed with each of cam shapes with a point symmetry of 180-degree angles around a rotational axis thereof; two turrets for feed engaged at a symmetrical position of 180-degree angles with the cam for feed with the latter sandwiched therebetween, and converting the rotation of the input shaft into the rocking rotations; four turrets for clamp engaged at a symmetrical position of 180-degree angles with each cam for clamp with the latter sandwiched therebetween, and converting the rotation of the input shaft into the rocking rotations in a direction orthogonal to the direction of the rocking rotation of the turrets for feed; a feed motion conversion mechanism provided between the turrets for feed and the feed bars to convert the rocking rotation of each turret for feed into the feed motion of each feed bar; and a clamp motion conversion mechanism provided between the turrets for clamp and the feed bars to convert the rocking rotation of each turret for clamp into the clamp motion of each feed bar; wherein the cam shape for feed is so set as to stop the turrets for feed during the rocking rotations of the turrets for clamp, and the cam shape for clamp is so set as to stop the turrets for clamp during the rocking rotations of the turrets for feed; the feed motion conversion mechanism comprises a pair of moving tables individually mounted on each feed bar, grooves for feed formed in each moving table along the direction of the feed bars moving close to and away from each other, rocking arms for feed provided on each turret for feed, and sliders provided on each rocking arm for feed and disposed slidably in each groove for feed; the clamp motion conversion mechanism comprises the pair of moving tables, grooves for clamp formed in each moving table along a direction orthogonal to the direction of the grooves for feed, rocking arms for clamp provided on each turret for clamp, and sliders provided on each rocking arm for clamp and disposed slidably in each groove for clamp; each of the feed bars is provided with a plurality of clamp pawls for clamping a work in opposed portions opposed to each other, the clamp pawls located at fixed intervals corresponding to the rocking rotational angle of the turrets for feed; and the work is clamped by each clamp pawl in the clamp motion of the feed bars, and the clamped work is carried by the feed motion of the feed bars.

On the other hand, a carrier apparatus according to the present invention comprises an input shaft in which a rotational driving force is input from a mechanical apparatus to which the carrier apparatus is applied; a pair of feed bars arranged in parallel with each other, capable of being reciprocated in a direction of moving close to and away from each other and in a direction orthogonal thereto, and each feed bar carrying out a rectangular motion; one cam for clamp coaxially provided on the input shaft integrally rotatably and being formed with a cam shape with a point symmetry of 180-degree angles around a rotational axis thereof; two cams for feed coaxially provided on the input shaft integrally rotatably and being formed with each of cam shapes with a point symmetry of 180-degree angles around a rotational axis thereof; two turrets for clamp engaged at a symmetrical position of 180-degree angles with the cam for clamp with the latter sandwiched therebetween, and converting the rotation of the input shaft into the rocking rotations; four turrets for feed engaged at a symmetrical position of 180-degree angle with each cam for feed with the latter sandwiched therebetween, and converting the rotation of the input shaft into the rocking rotations in a direction orthogonal to the direction of the rocking rotation of the turrets for clamp; a clamp motion conversion mechanism provided between the turrets for clamp and the feed bars to convert the rocking rotation of each turret for clamp into the clamp motion of each feed bar; and a feed motion conversion mechanisms provided between the turrets for feed and the feed bars to convert the rocking rotation of each turret for feed into the feed motion of each feed bar; wherein the cam shape for feed is so set as to stop the turrets for feed during the rocking rotations of the turrets for clamp, and the cam shape for clamp is so set as to stop the turrets for clamp during the rocking rotations of the turrets for feed; the feed motion conversion mechanism comprises a pair of moving tables individually mounted on each feed bar, grooves for feed formed in each moving table along the direction of the feed bars moving close to and away from each other, rocking arms for feed provided on each turret for feed, and sliders provided on each rocking arm for feed and disposed slidably in each groove for feed; the clamp motion conversion mechanism comprises the pair of moving tables, grooves for clamp formed in each moving table along a direction orthogonal to the direction of the grooves for feed, rocking arms for clamp provided on each turret for clamp, and sliders provided on each rocking arm for clamp and disposed slidably in each groove for clamp; each of the feed bars is provided with a plurality of clamp pawls for clamping a work in opposed portions opposed to each other, the clamp pawls located at fixed intervals corresponding to the rocking rotational angle of the turrets for feed; and the work is clamped by each clamp pawl in the clamp motion of the feed bars, and the clamped work is carried by the feed motion of the feed bars.

The operation of the carrier apparatus according to the present invention constructed as described above will be described hereinafter. When the rotational driving force is input into the input shaft, the cams for feed and the cams for clamp are integrally rotated. Since these cams have their cam shape formed in point symmetry of 180-degree angles around their rotational axes, each pair of turrets for feed and turrets for clamp engaged with the cams at a symmetrical position of 180-degree angles with the latter sandwiched therebetween makes exactly the same movement in the phase reversed to each other, and in the relationship between the turrets for feed and the turrets for clamp, the rocking rotations in a direction orthogonal to each other from the rotation of the input shaft is produced.

Each of the rocking rotations of said turrets for feed is converted into the feed motion of the respective feed bars through the feed motion conversion mechanism, and also each of the rocking rotations of said turrets for clamp is converted into the clamp motion of the respective feed bars through the clamp motion conversion mechanism.

The clamp motion produces the movement of the feed bars moving close to and away from each other, and the clamp operation and the release operation to the work are obtained in the feed bars. On the other hand, the feed motion produces the movement of the feed bars reciprocating in a direction orthogonal to the direction of the clamp motion, and the feed operation of the work and the return operation are obtained in the feed bars. Thereby, a series of carrying operations for the work can be smoothly obtained.

Especially, the rectangular motion of each of the feed bars are created by the cams for feed and clamp provided on the input shaft. In the present invention, at least three cams are applied for the each feed bar to generate this motion thereof together with the respective motion conversion mechanisms through the turrets, thereby the two-dimensional rectangular motion of each feed bar can be controlled by at least three portions corresponding to the three cams. Therefore, when the feed bars are caused to effect the rectangular motion for carrying the works, there need not to provide means for securing the parallel movement separately, and the feed bars can be caused to effect the rectangular motion smoothly while maintaining the parallelism each other.

In the way as described above, a series of carrying operations caused by the rectangular motion of the feed bars in synchronism with the single input shaft can be produced mechanically by the smooth movement obtained by the cams. Therefore, the complicated and high accurate adjustments such as adjustment of timing need not be carried out, the high speed operation of the carrier apparatus becomes enabled, the creation of the rectangular motion can be obtained merely by the rotational operation of the constituent elements, the motion stability is high, the number of constituent elements is less, the construction is simple and the miniaturization of the carrier apparatus can be attained.

Further, one cam is provided for feed, two cams are provided for clamp, two turrets are provided for feed, four turrets are provided for clamp, and each turret for feed is connected to the respective feed bar through the feed motion conversion mechanism and each paired turrets for clamp is connected to the respective feed bar through the clamp motion conversion mechanism, whereby the carrier apparatus is constituted by the apparatus constitution at the minimum as necessary. Therefore, both the feed bars are caused to effect the rectangular motion smoothly, and the stabilized carrying operation is secured. The apparatus more suitable for high speed operation can be constituted due to the less number of constituent parts, and the carrier apparatus can be further miniaturized.

Further, the rocking rotation of the turrets for feed is transmitted to the sliders through the rocking arms for feed, and these sliders press the moving tables in the reciprocating direction through the grooves for feed, and therefore, the feed bars mounted on the moving tables can be caused to effect the feed motion. Since the grooves for feed are formed in the direction of clamp motion, this clamp motion is not impaired by the sliders provided in the grooves for feed.

Furthermore, the rocking rotation of the turrets for clamp is transmitted to the sliders through the rocking arms for clamp, and these sliders press the moving tables in the direction of the feed bars moving close to and away from each other through the grooves for clamp, and therefore, the feed bars mounted on the moving tables can be caused to effect the clamp motion. Since the grooves for clamp are formed in the direction of reciprocating motion orthogonal to the direction of clamp motion, the feed motion is not impaired by the sliders provided in the grooves for clamp.

DETAILED DESCRIPTION OF THE PREFERRED EMBODIMENTS

The embodiments of the present invention will be explained in detail hereinafter with reference to the accompanying drawings.

Figure 1:
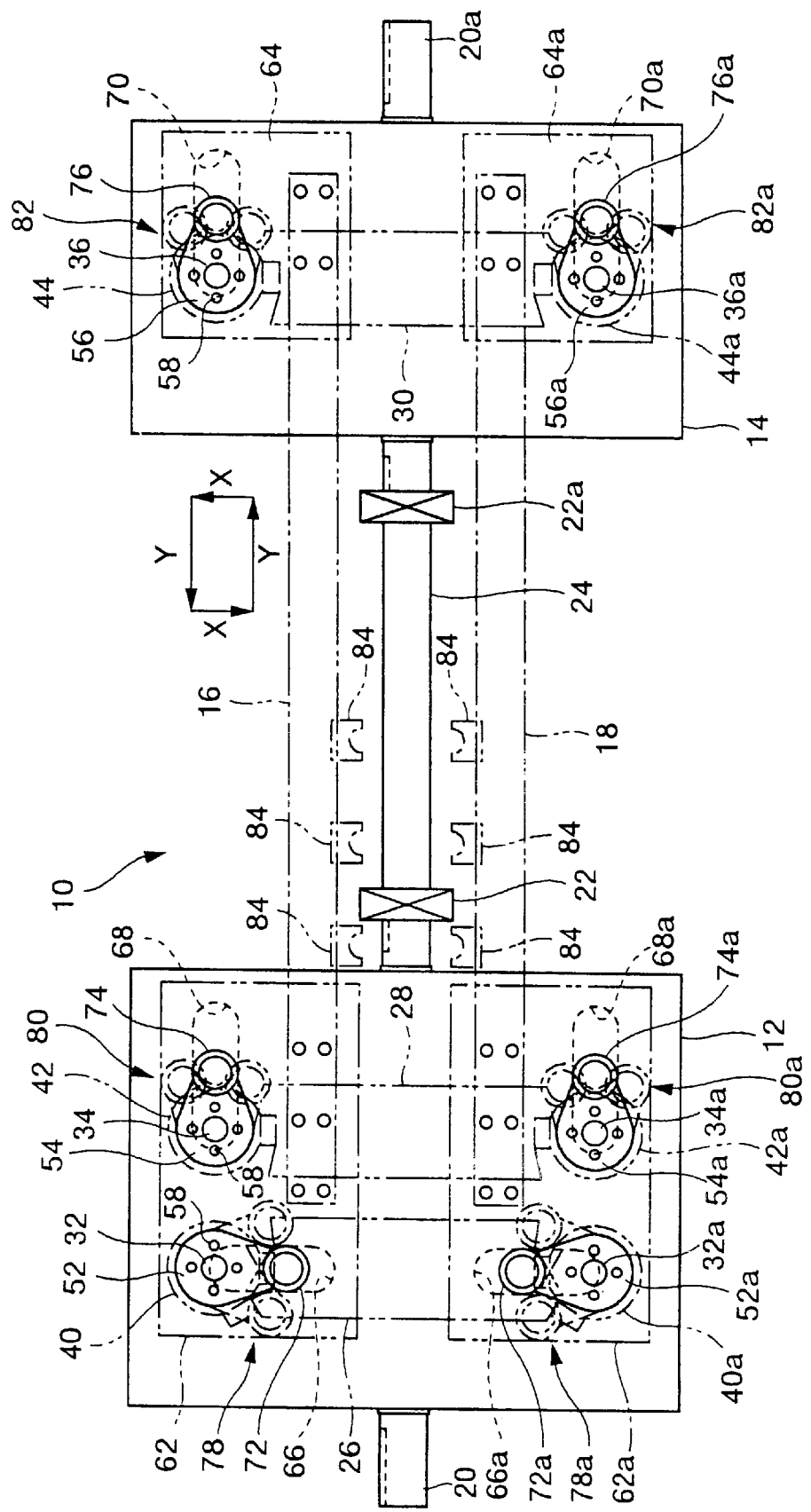
FIG. 1 is a plan view of a carrier apparatus showing one embodiment of the present invention.

As shown in FIG. 1, a carrier apparatus 10 according to the present embodiment comprises a pair of housings 12, 14 arranged at fixed intervals, and a pair of feed bars 16, 18 are arranged parallel with each other between these housings 12, 14. Each of the feed bars 16, 18 are subjected to rectangular movement in a direction X of moving close to and away from each other and in a direction Y (hereinafter called a carrier direction) orthogonal to the direction X by a rotational driving force input into input shafts 20, 20a supported on the housings 12, 14, respectively, to thereby carry a work.

Each of the input shafts 20, 20a extends through the respective housing 12, 14 and are arranged along the carrier direction Y. The input shafts 20, 20a are connected with each other by an intermediate shaft 24 through couplings 22, 22a. A driving force of a machine tool, for example, a press apparatus for which the carrier apparatus 10 is used, is input into both of the input shafts 20, 20a.

Figure 2:
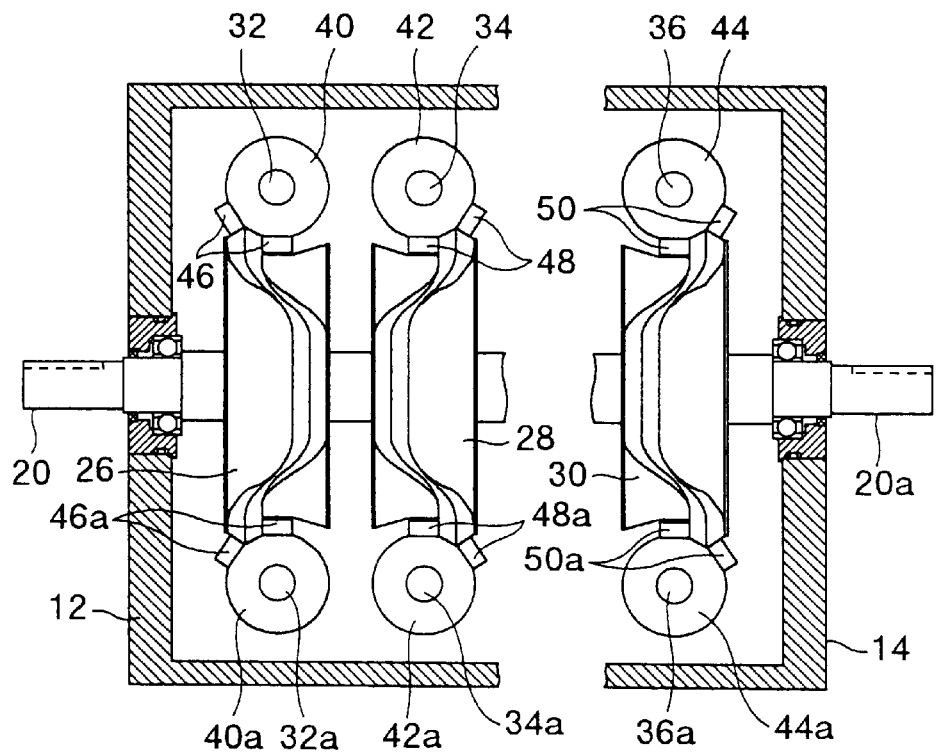
FIG. 2 is a sectional plan view of a carrier apparatus showing one embodiment of the present invention.

A cam 26 for feed and a first cam 28 for clamp are housed in the first housing 12, and a second cam 30 for clamp is housed in the second housing 14, as shown in FIG. 2. These cams 26, 28, 30 are coaxially mounted integrally rotatably on the input shafts 20, 20a through a key 31 (see FIG. 3).

In the cam 26 for feed, a cam shape is formed in point symmetry of 180-degree angles around the rotational axis thereof, and also in the cams 28, 30 for clamp, each cam shape is likewise formed in point symmetry of 180-degree angles around the rotational axis thereof. In this case, the cams 28, 30 for clamp are arranged so that their phases are in synchronism with each other in the rotational direction.

Figure 3:
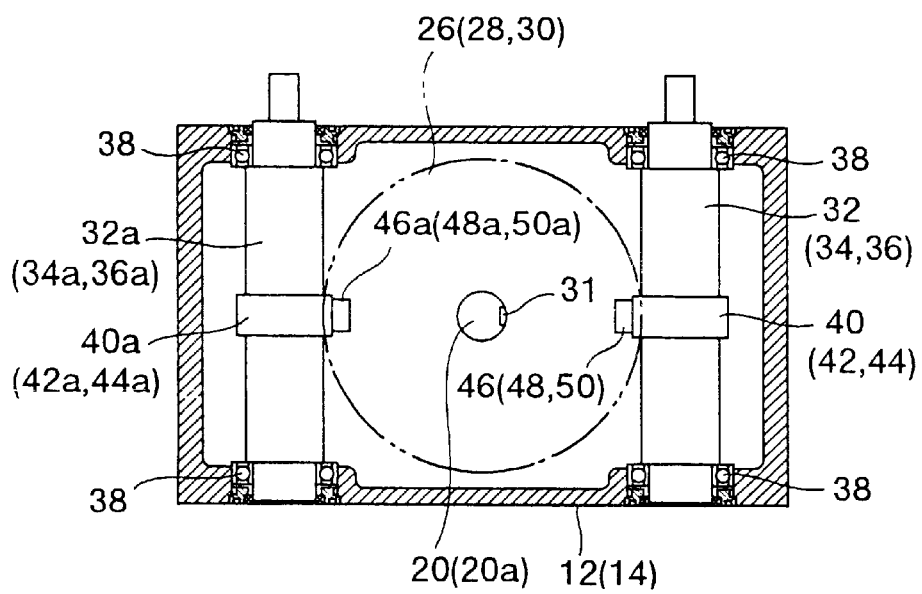
FIG. 3 is a sectional side view of a carrier apparatus showing one embodiment of the present invention.

Three pairs of rotational shafts 32, 32a, 34, 34a, 36, 36a are arranged on both sides in a horizontal direction with respect to the respective cams 26, 28, 30 with each of the cams 26, 28, 30 sandwiched therebetween as shown in FIG. 3. Both upper and lower ends of these rotational shafts 32, 32a, 34, 34a, 36, 36a are rotatably supported on the housings 12, 14 through bearings 38. A pair of turrets 40, 40a for feed, two pairs of turrets 42, 42a, 44, 44a for clamp are mounted integrally rotatably on the rotational shafts 32, 32a, 34, 34a, 36, 36a, respectively. The turrets 40, 40a, 42, 42a, 44, 44a are placed in sliding contact to the respective cams 26, 28, 30 at a symmetrical position of 180-degree angles with the each cam 26, 28, 30 sandwiched therebetween.

Three pairs of cam followers 46, 46a, 48, 48a, 50, 50a which are placed in sliding contact with the respective cams 26, 28, 30 are provided on each of the turrets 40, 40a, 42, 42a, 44, 44a. The cam followers 46, 46a, 48, 48a, 50, 50a convert rotations of the cams 26, 28, 30 into rocking rotations of the turrets 40, 40a, 42, 42a, 44, 44a to thereby rock and rotate the rotational shafts 32, 32a, 34, 34a, 36, 36a.

Figure 4:
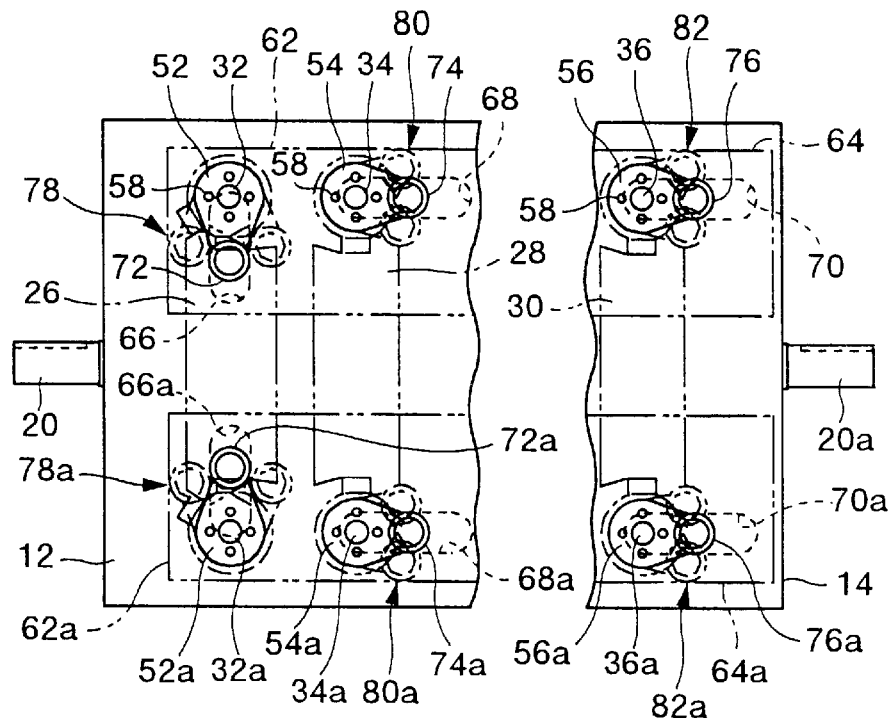
FIG. 4 is a plan view showing, in an enlarged scale, main parts of a carrier apparatus showing one embodiment of the present invention.
Figure 5:
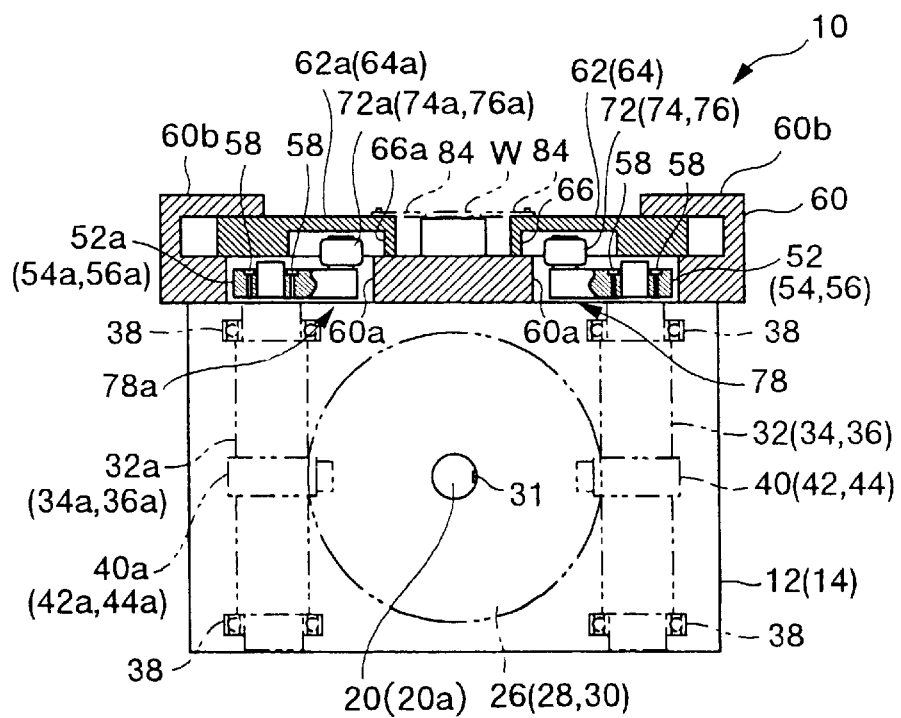
FIG. 5 is a sectional side view of main parts of a carrier apparatus showing one embodiment of the present invention.
Figure 6:
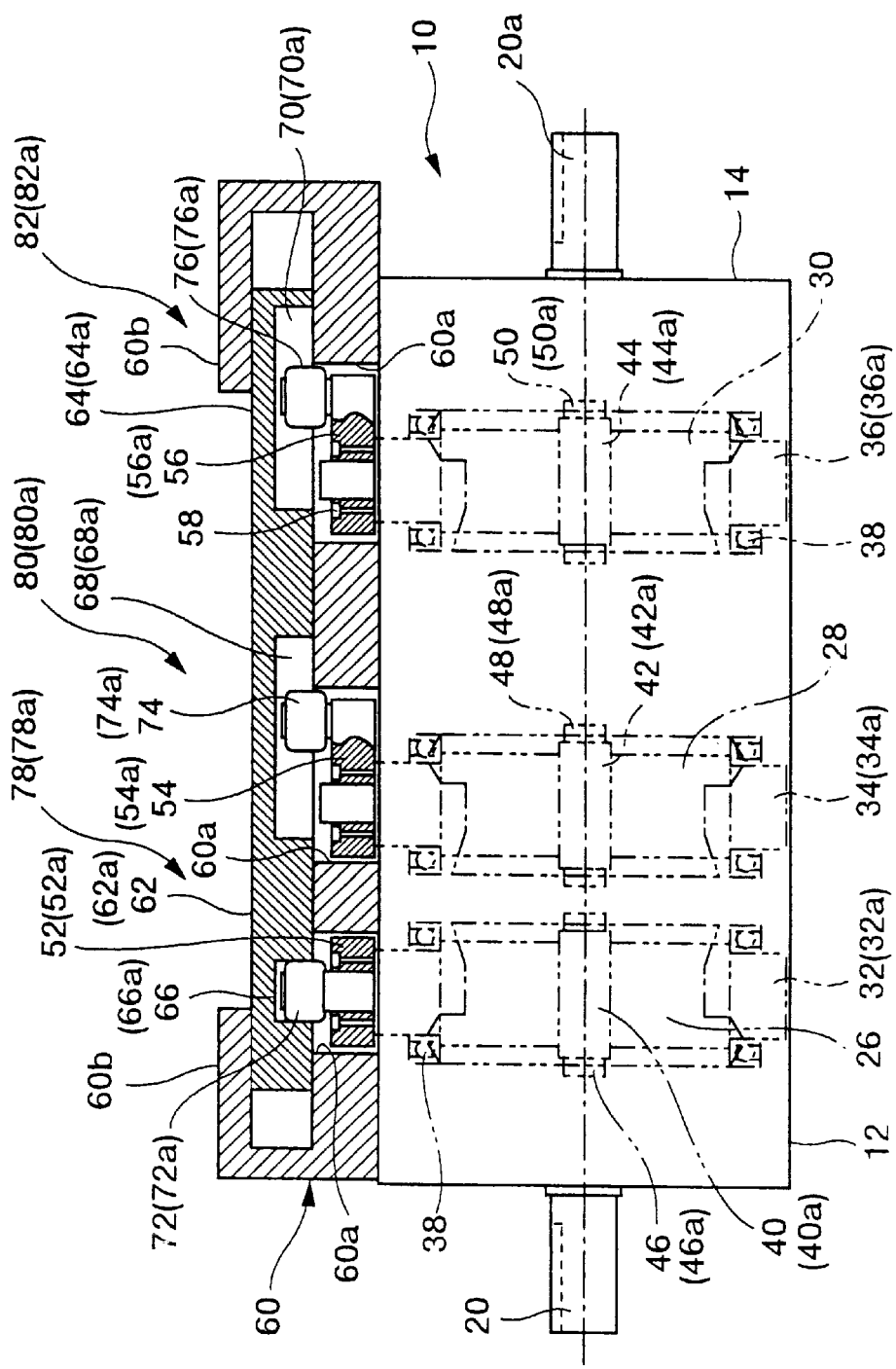
FIG. 6 is a sectional front view of main parts of a carrier apparatus showing one embodiment of the present invention.

The upper ends of the rotational shafts 32, 32a, 34, 34a, 36, 36a are reduced in diameter as shown in FIG. 3 and are projected from the upper surfaces of the housings 12, 14, and the ends thereof are fitted in the rocking arms 52, 52a, 54, 54a, 56, 56a as shown in FIGS. 4 and 5, the rocking arms 52, 52a, 54, 54a, 56, 56a being secured by screws 58 at the ends so that these rocking arms 52, 52a, 54, 54a, 56, 56a are mounted integrally rotatably to the rotational shafts 32, 32a, 34, 34a, 36, 36a, respectively.

A guide block 60 formed with an operating concave portion 60a of the rocking arms 52, 52a, 54, 54a, 56, 56a is mounted on the upper surfaces of the housings 12, 14, as shown in FIG. 5. The guide block 60 is formed on both ends with bend portions 60b bent inwardly, and two pairs of moving tables 62, 62a 64, 64a spaced apart to left and right are slidably attached into the each bend portion. The both ends of each of the feed bars 16, 18 are secured over the moving tables 62, 62a, 64, 64a, respectively, as shown in FIG. 1.

Each of the first moving tables 62, 62a is formed in its lower surface with respective grooves 66, 66a for feed and respective first grooves 68, 68a for clamp. Each of the grooves 66, 66a for feed is formed corresponding to the mounting position of each rocking arm 52, 52a for feed and elongated along the direction X. Each of the grooves 68, 68a for clamp is formed corresponding to the mounting position of each rocking arm 54, 54a for clamp and elongated along the carrier direction Y. Further, each of the second moving tables 64, 64a is formed in each lower surface with respective second grooves 70, 70a for clamp corresponding to the mounting position of each rocking arm 56, 56a for clamp and being elongated along the carrier direction Y.

On the other hand, each of the rollers 72, 72a, 74, 74a, 76, 76a as sliders is mounted on the upper side at the end of each rocking arm 52, 52a, 54, 54a, 56, 56a. Each of the rollers 72, 72a, 74, 74a, 76, 76a is engaged slidably with the respective grooves 66, 66a, 68, 68a, 70, 70a.

The motion conversion mechanisms 78, 78a for feed are constituted by the rocking arms 52, 52a, the rollers 72, 72a, and the grooves 66, 66a formed in each first moving table 62, 62a. The motion conversion mechanisms 80, 80a, 82, 82a for clamp are constituted by the rocking arms 54, 54a, 56, 56a, the rollers 74, 74a, 76, 76a, and the grooves 68, 68a, 70, 70a formed in each of the second moving tables 62, 62a, 64, 64a.

A plurality of clamp pawls 84 for clamping a work are mounted on the opposed edge portions of each of the feed bars 16, 18 shown in FIG. 1 at fixed intervals corresponding to one feed amount, that is, the rocking angle of the rocking arms 52, 52a for feed.

With the above-described constitution, in the carrier apparatus 10 according to the present embodiment, when the rotational driving force is input into the input shafts 20, 20a, the cams 26, 28, 30 mounted on the input shafts 20, 20a are rotated. The rotation of the cams 26, 28, 30 are converted into the rocking rotation by the turrets 40, 40a, 42, 42a, 44, 44a through the cam followers 46, 46a, 48, 48, 50, 50a.

Figure 7:
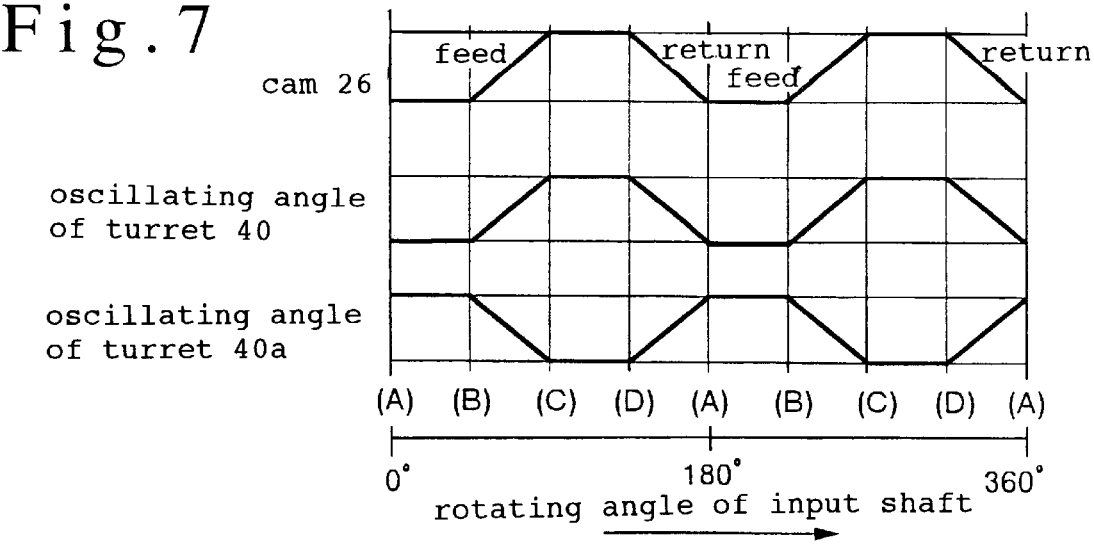
FIG. 7 is a time chart of an rocking angle of a turret with respect to a rotational angle of a cam for feed used in a carrier apparatus showing one embodiment of the present invention.
Figure 8:
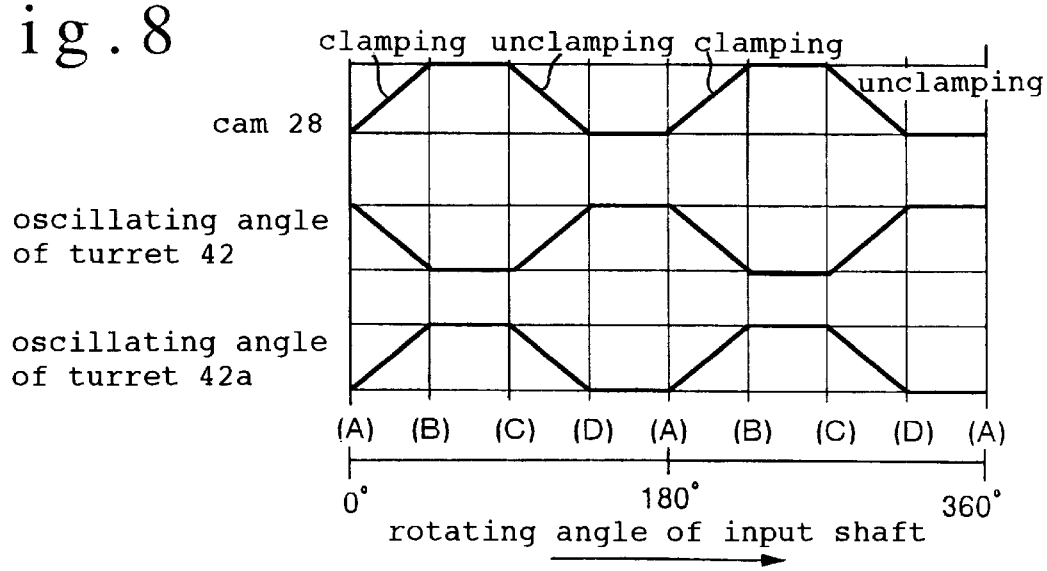
FIG. 8 is a time chart of an rocking angle of a turret with respect to a rotational angle of a cam for a first clamp of a carrier apparatus showing one embodiment of the present invention.
Figure 9:
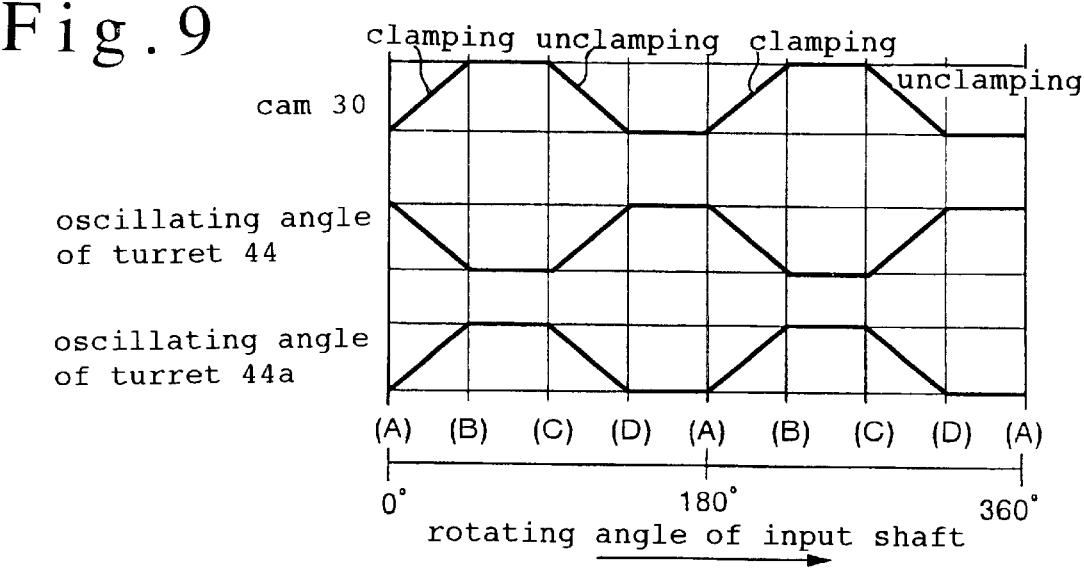
FIG. 9 is a time chart of an rocking angle of a turret with respect to a rotational angle of a cam for a second clamp of a carrier apparatus showing one embodiment of the present invention.

In the cams 26, 28, 30, each of the cam shapes is formed in point symmetry of 180-degree angles around the its axis while the paired turrets 40, 40a, 42, 42a, 44, 44a are placed in sliding contact with the respective cams 26, 28, 30 at a symmetrical position of 180-degree angles therebetween, so that the rocking rotations between the turrets 40, 42, 44, and the turrets 40a, 42a, 44a are output in reverse in phase each other with respect to the paired turrets 40, 40a, 42, 42a, 44, 44a, as shown in FIGS. 7 to 9.

When the rocking rotations of the turrets 40, 40a for feed are transmitted to the respective rocking arms 52, 52a for feed through the rotational shafts 32, 32a, and the rollers 72, 72a are rocked and move within the respective grooves 66, 66a for feed engaged therewith.

Since the grooves 66, 66a for feed are formed in the direction X, the rollers 72, 72a apply the pressing force to the internal sides of the grooves 66, 66a while escaping the moving components in the direction X.

Figure 10:
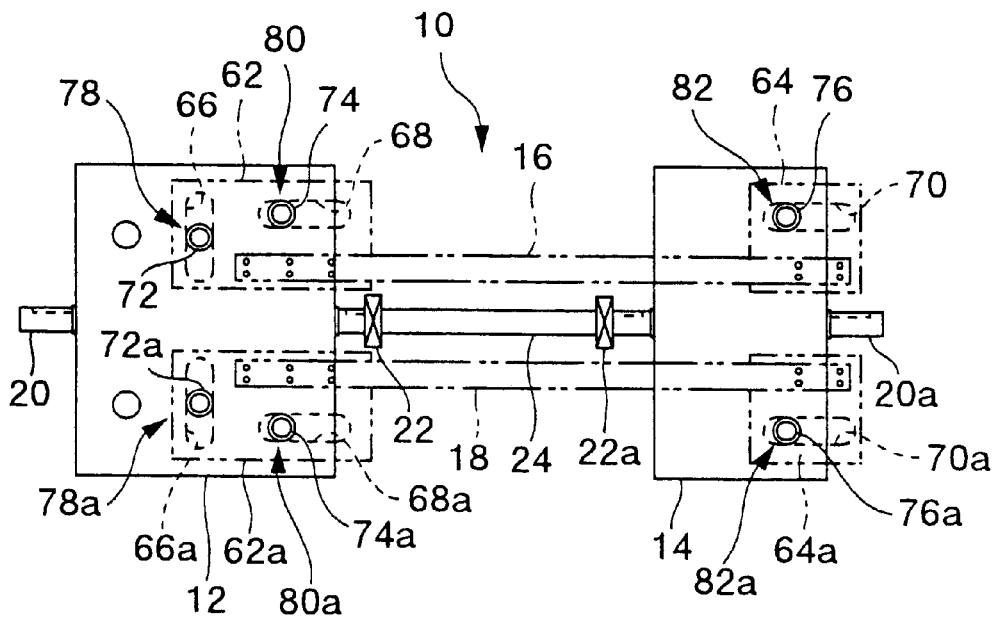
FIG. 10 is a plan view of the state in which a carrier apparatus showing one embodiment of the present invention is operated in a feed direction.

Because of this, the pressing force exerts on the moving tables 62, 62a in the direction at right angles to the direction of the grooves 66, 66a, that is, in the carrier direction Y by the rocking motion of the rocking arms 52, 52a for feed, and therefore, it is possible to cause the feed bars 16, 18 mounted on the moving tables 62, 62a, 64, 64a to effect the feed motion as shown in FIG. 10.

When the rocking rotations of the turrets 42, 42a, 44, 44a for clamp are transmitted to the respective rocking arms 54, 54a, 56, 56a for clamp through the rotational shafts 34, 34a, 36, 36a, the rollers 74, 74a, 76, 76a are rocked and move within the respective grooves 68, 68a, 70, 70a for clamp engaged therewith.

Since the grooves 68, 68a, 70, 70a for clamp are formed in the carrier direction Y, the rollers 74, 74a, 76, 76a apply the pressing force to the internal sides of the grooves 68, 68a, 70, 70a while escaping the moving components in the direction Y.

Figure 11:
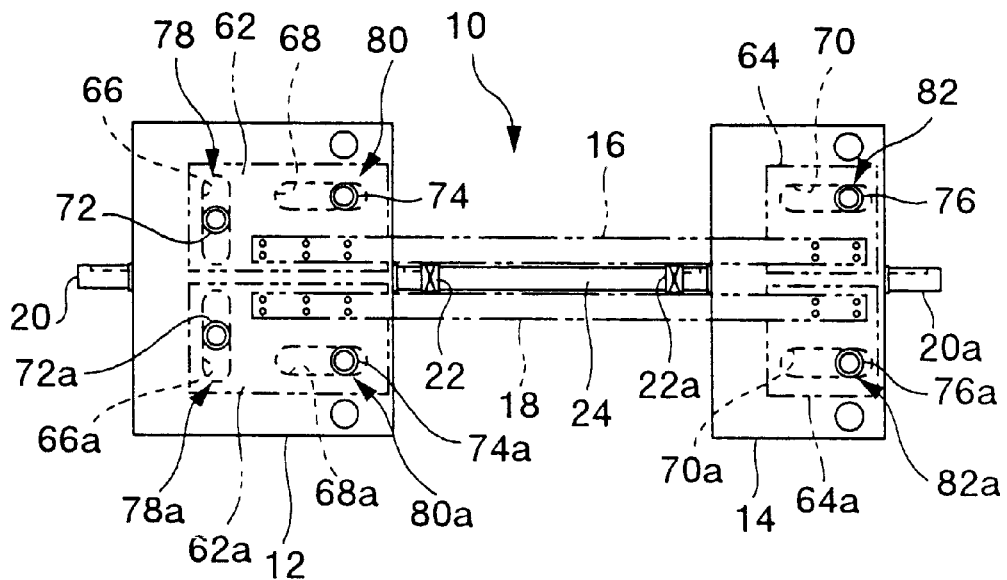
FIG. 11 is a plan view of the state in which a carrier apparatus showing one embodiment of the present invention is operated in a clamp direction.

Because of this, the pressing force exerts on both of the moving tables 62, 62a, 64, 64a in the direction at right angles to the direction of the grooves 68, 68a, 70, 70a, that is, in the direction X of the feed bars 16, 18 moving close to and away from each other by the rocking motions of the rocking arms 54, 54a, 56, 56a, and therefore, it is possible to cause the feed bars 16, 18 mounted on the moving tables 62, 62a, 64, 64a to effect the clamp motion as shown in FIG. 11.

Since the cams 28, 30 for clamp are arranged with their phases synchronized with each other in the rotational direction, when the feed bars 16, 18 are caused to effect the clamp motion in the direction X, the feed bars 16, 18 are caused to effect the proximate (clamp) operation and remote (unclamp) operation while maintaining a parallel relationship. Further, when the feed bars 16, 18 are caused to effect the feed motion in the direction Y, the feed bars 16, 18 are slidably guided by the two pairs of the engagements of the grooves 68, 68a, 70, 70a for clamp with the rollers 74, 74a, 76, 76a, and therefore, the feed bars 16, 18 are moved in the carrier direction Y while holding the parallel state. That is, at least three cams 26, 28, 30 are applied for the each feed bar 16, 18 to generate this motion thereof together with the respective motion conversion mechanisms 78, 78a, 80, 80a, 82, 82a through the turrets 40, 40a, 42, 42a, 44, 44a, thereby the two-dimensional rectangular motion of each feed bar 16, 18 can be controlled by at least three portions corresponding to the three cams 26, 28, 30. Therefore, when the feed bars 16, 18 are subjected to the rectangular motion for feed and clamp, these feed bars 16, 18 can be subjected to the smooth rectangular motion while maintaining a mutual parallelism without requiring a separate provision of means for securing the parallel movement thereon.

The operation of the aforementioned carrier apparatus 10 will be illustrated in order with reference to schematic views shown in FIGS. 12 to 15. In these drawings, the first moving table 62, the second moving table 64 and the first feed bar 16 are shown in the integral form, and the first moving table 62a, the second moving table 64a and the second feed bar 18 are shown in the integral form. First, FIG. 12 corresponds to (A) of time charts of FIGS. 7 to 9 in the initial state. The feed bars 16, 18 are parted from each other with a work W unclamped, and positioned at the left end in the carrier direction Y. In the figures, reference numeral 86 designates a supply portion for the work W, and reference numeral 88 designates a removing portion for the work W.

Figure 13:
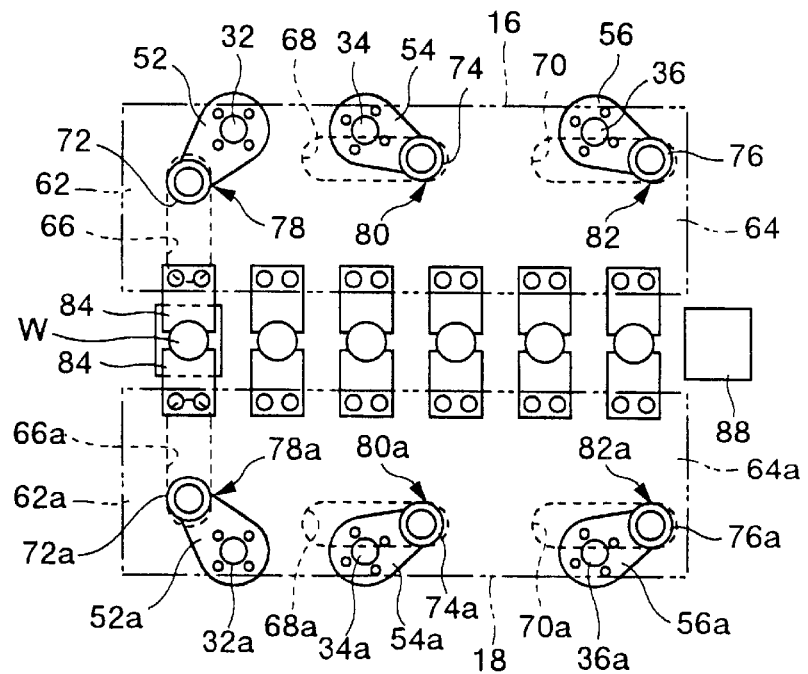
FIG. 13 is a schematic plan view of the clamp state of a carrier apparatus showing one embodiment of the present invention.

When the input shafts 20, 20a rotate from the initial state, the turrets 42, 42a, 44, 44a for clamp start to rock so that the feed bars 16, 18 effect the clamp motion in the direction close to each other to clamp the work W between the opposed clamp pawls 84, 84 as shown in FIG. 13. This clamp state corresponds to (B) of the time chart described above.

Figure 14:
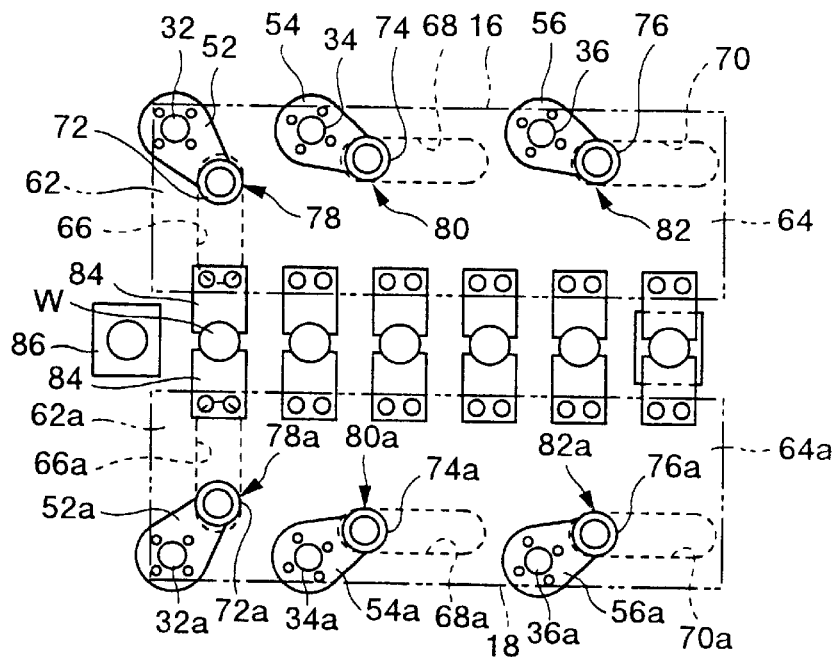
FIG. 14 is a schematic plan view of the feed state of a carrier apparatus showing one embodiment of the present invention.

Upon completion of the clamp motion, the turrets 40, 40a for feed start to rock so that the feed bars 16, 18 effect the feed motion rightward in the figure while maintaining the clamp state to carry the work W by one pitch as shown in FIG. 14. This feed state corresponds to (C) of the time chart described above.

Figure 15:
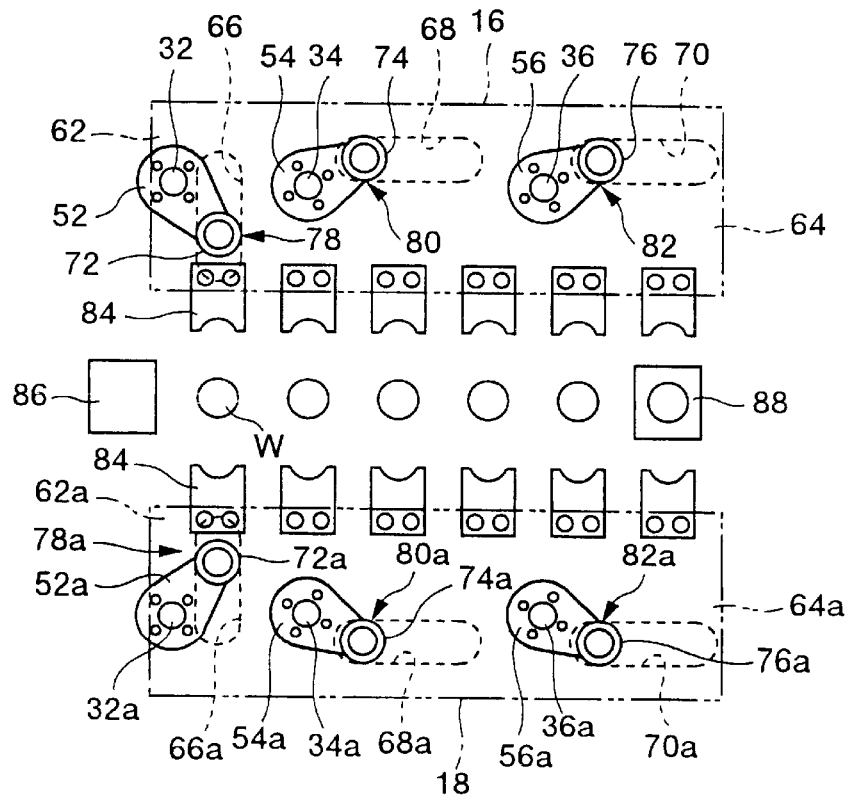
FIG. 15 is a schematic plan view of the unclamp state of a carrier apparatus showing one embodiment of the present invention.

Then, upon completion of the above-described carrying, the turrets 42, 42a, 44, 44a for clamp start to rock in the reverse direction so that the feed bars 16, 18 effect the clamp motion in the remote direction as shown in FIG. 15 to release the work W clamped between the clamp pawls 84, 84. This unclamp state corresponds to (D) the time chart described above.

Figure 12:
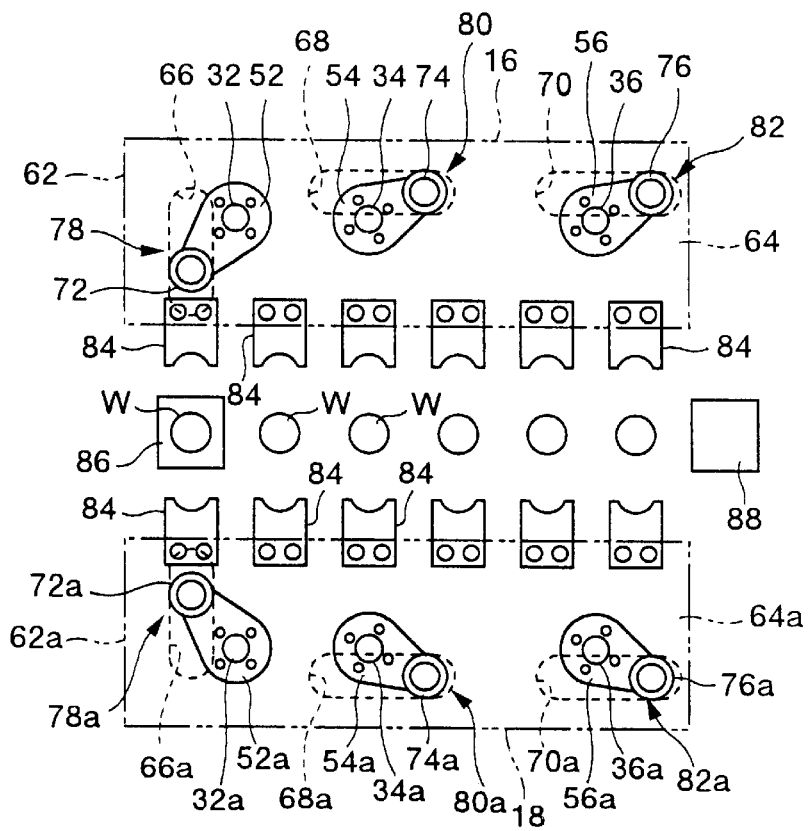
FIG. 12 is a schematic plan view of the initial state of a carrier apparatus showing one embodiment of the present invention.

Upon completion of the unclamping, the turrets 40, 40a for feed start to rock in the reverse direction so that the feed bars 16, 18 returns to the initial state corresponding to (A) of the time chart, as shown in FIG. 12. Accordingly, the feed bars 16, 18 continuous effect a series of rectangular motion including gripping, feeding, releasing and returning shown in FIGS. 12 to 15 to thereby carry the work W pitch by pitch.

Accordingly, in the carrier apparatus 10 according to the present embodiment described above, since each of the cam shapes of the cams 26, 28, 30 is formed in point symmetry of 180-degree angles around the rotational axis thereof, the turrets 40, 40a, 42, 42a, 44, 44a engaged at a symmetrical position of 180-degree angles with the respective cams 26, 28, 30 sandwiched therebetween can be caused to effect exactly the same movement in the reverse phase with respect to each pairs of the turrets 40, 40a 42, 42a, 44, 44a, and in the relationship between the turrets 40, 40a for feed and the turrets 42, 42a, 44, 44a for clamp, they can be caused to effect the rocking rotation in the X-Y direction orthogonal to each other from the rotation of the input shafts 20, 20a. The rocking rotations of the turrets 40, 40a for feed are converted into the feed motions of the feed bars 16, 18 though the feed motion conversion mechanisms 78, 78a, that is, the movement for reciprocating the feed bars 16, 18 in the carrier direction Y is produced so that the feeding operation after the work W has been clamped and the returning operation after the work W has been released can be produced in the feed bars 16, 18. The rocking rotations of the turrets 42, 42a, 44, 44a for clamp are converted into the clamp motions of the feed bars 16, 18 though the clamp motion conversion mechanisms 80, 80a, 82, 82a, that is, the movement for moving the feed bars 16, 18 close to and away from each other can be produced to create the clamping operation and the releasing operation of the work W to the feed bars 16, 18, and thereby obtaining smoothly a series of carrier operation including clamping, feeding and releasing of the work W.

A series of carrier operations from rotation of single series of the input shafts 20, 20a to rectangular motion of the feed bars 16, 18 in synchronism therewith can be produced mechanically by smooth movement of the cams 26, 28, 30. Therefore, complicated and high accurate adjustment such as adjustment of timing are not necessary to enable high speed operation of the carrier apparatus 10, and the creating of rectangular motion can be obtained by mere rotational operation of constituent elements to achieve miniaturization of the carrier apparatus 10 which is high in motion stability, less in constituent elements and simple in construction.

In the present embodiment, the feed motion conversion mechanisms 78, 78a are constituted by the moving tables 62, 62a, the grooves 66, 66a, the rocking arms 52, 52a provided on rotational shafts 32, 32a, and the rollers 72,72a. The rocking rotations of the turrets 40, 40a are transmitted to the rollers 72, 72a through the rocking arms 52, 52a, and the moving tables 62, 62a are pressed in the carrier direction Y through the grooves 66, 66a by the rollers 72, 72a whereby the feed bars 16, 18 mounted on the moving tables 62, 62a can be caused to effect the feed motion adequately. Even the constitution in which the rollers 72, 72a for reciprocating the moving tables 62, 62a are provided in the grooves 66, 66a for the feed motion, the smooth clamp motion can be secured since the grooves 66, 66a are formed in the direction X.

Further, the clamp motion conversion mechanisms 80, 80a, 82, 82b are constituted by the moving tables 62, 62a, 64, 64a, the grooves 68, 68a, 70, 70a, the rocking arms 54, 54a, 56, 56a provided on the rotational shafts 34, 34a, 36, 36a, and the rollers 74, 74a, 76, 76a. The rocking rotations of the turrets 42, 42a, 44, 44a are transmitted to the rollers 74, 74a, 76, 76a through the rocking arms 54, 54a, 56, 56a, and the moving tables 62, 62a, 64, 64a are pressed in the direction through the grooves 68, 68a, 70, 70a by the rollers 74, 74a, 76, 76a. Therefore, the feed bars 16, 18 mounted on the moving tables 62, 62a, 64, 64a can be caused to effect the clamp motion adequately. Even the constitution in which the rollers 74, 74a, 76, 76a for the clamp motion are provided in the grooves 68, 68a, 70, 70a, the smooth feed motion can be secured since the grooves 68, 68a, 70, 70a for clamp are formed in the carrier direction Y.

Figure 16:
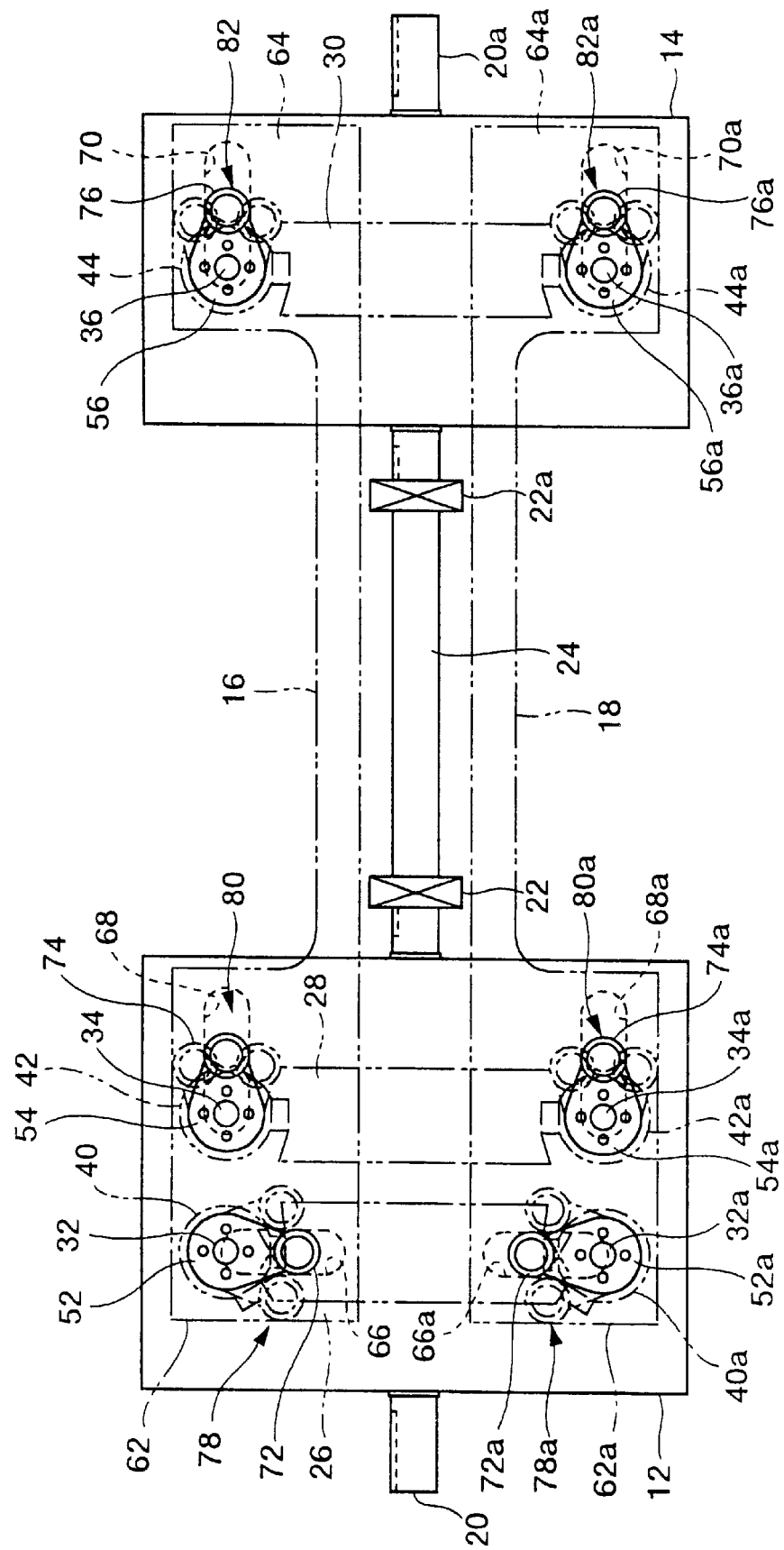
FIG. 16 is a plan view corresponding to FIG. 1 showing a carrier apparatus according to another embodiment of the present invention.

While in the above-described embodiment, a disclosure was made of the case where the pair of feed bars 16, 18 formed separately from the moving tables 62, 62a, 64, 64a are integrally connected by bolts or the like, it is to be noted that the arrangement is not limited thereto but the moving tables 62, 62a, 64, 64a can be formed integral with both ends of the feed bars 16, 18 as shown in FIG. 16. This embodiment is similar to the aforementioned embodiment except that the feed bars 16, 18 and the moving tables 62, 62a, 64, 64a are integrally formed.

While in the carrier apparatuses 10 in the respective embodiments, a disclosure was made of the case where two cams 28, 30 for clamp are provided for causing the feed bars 16, 18 to effect the clamp motion, it is to be noted of course that one cam for clamp and two cams for feed may constitute the carrier apparatus 10.

Further, while in the above-described embodiments, a case was illustrated where the housing of the carrier apparatus 10 is separated into the two housings 12, 14, it is to be noted that a single housing in which these housings 12, 14 are integrated may be employed (see, for example, FIG. 6, FIGS. 12 to 15).

Further, while in the above-described embodiments, a case was explained where the feed motion and the clamp motion are carried out alternately as shown in the time charts of FIGS. 7 to 9, it is to be noted that the cam curve is suitably set to overlap these motions whereby the carrier operation can be speeded up.

As described above, in the carrier apparatus according to the present invention, since the cams for feed and for clamp coaxially provided on the input shaft integrally rotatably have their cam shapes formed in point symmetry of 180-degree angles around the rotational axis, pairs of turrets for feed and for clamp engaged at a symmetrical position of 180-degree angles with the cams with the latter sandwiched therebetween are that each pairs of the turrets make exactly the same movement in the phase reversed to each other, and in the relationship between the turrets for feed and the turrets for clamp, the rocking rotation in a direction orthogonal to each other from the rotation of the input shaft is produced.

The rocking rotation of said pair of turrets for feed is converted into the feed motion of the feed bars through the feed motion conversion mechanism, and there produces the movement for reciprocating the feed bars in a direction orthogonal to a direction of the feed bars moving close to and away from each other to generate the feed operation after the work is clamped and the return operation after the work is released in the feed bars. Thereby, a series of carrying operations of clamping and releasing the work can be smoothly obtained.

Especially, at lease three cams, of which at least one cam is the one for either of feed or clamp while at least two cams are the ones for the other, are provided, and at least three motion conversion mechanisms are provided on the respective feed bars through the turrets. Therefore, the motion in two directions orthogonal to each other can be controlled at least three places whereby when the feed bars are caused to effect the rectangular motion, means for securing the parallel movement therefore need not be separately provided, and the feed bars can be caused to effect the rectangular motion smoothly while maintaining the parallelism each other.

In the way as described above, a series of carrying operations caused by the rectangular motion of the feed bars in synchronism with the single input shaft can be produced mechanically by the smooth movement caused by the cams. Therefore, the complicated and high accurate adjustments such as adjustment of timing need not be carried out, the high speed operation of the carrier apparatus becomes enabled, the creation of the rectangular motion can be obtained merely by the rotational operation of the constituent elements, the motion stability is high, the number of constituent elements is less, the construction is simple and the miniaturization of the carrier apparatus can be attained.

Further, one cam is provided for feed, two cams are provided for clamp, two turrets are provided for feed, four turrets are provided for clamp, and each turret for feed is connected to the respective feed bar through the feed motion conversion mechanism and each paired turrets for clamp is connected to the respective feed bar through the clamp motion conversion mechanism, whereby the carrier apparatus is constituted by the apparatus constitution at the minimum as necessary. Therefore, both the feed bars are caused to effect the rectangular motion smoothly, and the stabilized carrying operation is secured. The apparatus more suitable for high speed operation can be constituted due to the less number of constituent parts, and the carrier apparatus can be further miniaturized.

Further, the rocking rotation of the turrets for feed is transmitted to the sliders through the rocking arms for feed, and these sliders press the moving tables in the reciprocating direction through the grooves for feed, and therefore, the feed bars mounted on the moving tables can be caused to effect the feed motion. Even with the constitution in which the sliders are provided within the grooves for feed for reciprocating the moving tables, the smooth clamp motion can be secured because the grooves for feed are formed in the direction of the feed bars moving close to and away from each other.

Furthermore, the rocking rotation of the turrets for clamp is transmitted to the sliders through the rocking arms for clamp, and these sliders press the moving tables in the direction of the feed bars moving close to and away from each other through the grooves for clamp, and therefore, the feed bars mounted on the moving tables can be caused to effect the clamp motion. Further, even the constitution in which the sliders are provided within the grooves for clamp for moving the moving tables in the direction Y, the smooth clamp motion can be secured because the grooves for feed are formed in the direction X.

What is claimed is:

1. A carrier apparatus comprising:

an input shaft in which a rotational driving force is input;

a pair of feed bars arranged in parallel with each other, capable of being reciprocated in a direction of moving close to and away from each other and in a direction orthogonal thereto, and each feed bar carrying out a rectangular motion;

at least three cams, of which at least one cam is the one for either of feed or clamp while at least two cams are the ones for the other, being coaxially provided on said input shaft integrally rotatably, and being formed with each of cam shapes with a point symmetry of 180-degree angles around a rotational axis thereof;

a pair of turrets for feed engaged with said cams for feed at a symmetrical position of 180-degree angles with said cam sandwiched therebetween, and converting the rotation of said input shaft into the rocking rotations;

a pair of turrets for clamp engaged with said cams for clamp at a symmetrical position of 180-degree angles with said cams sandwiched therebetween, and converting the rotation of said input shaft into the rocking rotations in a direction orthogonal to the direction of the rocking rotations of said turrets for feed;

a feed motion conversion mechanism provided between said turrets for feed and said feed bars to convert the rocking rotation of said each turret for feed into the feed motion of said each feed bar; and a clamp motion conversion mechanism provided between said turrets for clamp and said feed bars to convert the rocking rotation of said each turret for clamp into the clamp motion of said each feed bars;

wherein a work is clamped by the clamp motion of said feed bars, and thus said clamped work is carried by the feed motion of said feed bars.

2. The carrier apparatus according to claim 1, wherein said cam for feed is provided one, said cams for clamp are provided two, and said turrets for feed are provided two and disposed on said cam for feed with the latter sandwiched therebetween, said turrets for clamp are provided four and disposed on said each cam for clamp with the latter sandwiched therebetween, and said each turret for feed is connected to said each feed bar through said feed motion conversion mechanism, and said turrets for clamp paired on the same side with respect to said cams for clamp are connected to said each feed bar through said clamp motion conversion mechanism.

3. The carrier apparatus according to claim 1, wherein said cams for feed are provided two, said cam for clamp is provided one, and said turrets for feed are provided four and disposed on said each cam for feed with the latter sandwiched therebetween, said turrets for clamp are provided two and disposed on said cam for clamp with the latter sandwiched therebetween, and said turrets for feed paired on the same side with respect to said cams for feed are connected to said each feed bar through said feed motion conversion mechanism, and said each turret for clamp is connected to said each feed bar through said clamp motion conversion mechanism.

4. The carrier apparatus according to claim 1, wherein said feed motion conversion mechanism comprises a pair of moving tables individually mounted on said each feed bar, grooves for feed formed in said each moving table along the direction of said feed bars moving close to and away from each other, rocking arms for feed provided on said each turret for feed, and sliders provided on said each rocking arm for feed and disposed slidably in said each groove for feed.

5. The carrier apparatus according to claim 1, wherein said clamp motion conversion mechanism comprises a pair of moving tables individually mounted on said each feed bar, grooves for clamp formed in said each moving table along a direction orthogonal to the direction of said feed bars moving close to and away from each other, rocking arms for clamp provided on said each turret for clamp, and sliders provided on said each rocking arm for clamp and disposed slidably in said each groove for clamp.

6. The carrier apparatus according to claim 1, wherein each of said feed bars is provided with a plurality of clamp pawls for clamping said work in opposed portions opposed to each other, and said clamp pawls are located at fixed intervals corresponding to the rocking rotational angle of said turrets for feed.

7. The carrier apparatus according to claim 1, wherein for alternately generating said feed motion and said clamp motion, said cam shape for feed is so set as to stop said turrets for feed during the rocking rotations of said turrets for clamp, and said cam shape for clamp is so set as to stop said turrets for clamp during the rocking rotations of said turrets for feed.

8. The carrier apparatus according to claim 1, wherein for overlapping said feed motion and said clamp motion, said cam shapes for feed and for clamp are so set as to rock and rotate said turrets for feed during the rocking rotations of said turrets for clamp.

9. The carrier apparatus according to claim 1, wherein the rotational driving force is input into said input shaft from the mechanical apparatus to which said carrier apparatus is applied.

10. The carrier apparatus according to claim 4, wherein each of said feed bars and each of said moving tables individually provided said respective feed bars are integrally formed.

11. A carrier apparatus comprising:

an input shaft in which a rotational driving force is input from a mechanical apparatus to which said carrier apparatus is applied;

a pair of feed bars arranged in parallel with each other, capable of being reciprocated in a direction of moving close to and away from each other and in a direction orthogonal thereto, and each feed bar carrying out a rectangular motion;

one cam for feed coaxially provided on said input shaft integrally rotatably and being formed with a cam shape with a point symmetry of 180-degree angles around a rotational axis thereof;

two cams for clamp coaxially provided on said input shaft integrally rotatably and being formed with each of cam shapes with a point symmetry of 180-degree angles around a rotational axis thereof;

two turrets for feed engaged at a symmetrical position of 180-degree angles with said cam for feed with the latter sandwiched therebetween, and converting the rotation of said input shaft into the rocking rotations;

four turrets for clamp engaged at a symmetrical position of 180-degree angles with said each cam for clamp with the latter sandwiched therebetween, and converting the rotation of said input shaft into the rocking rotations in a direction orthogonal to the direction of the rocking rotation of said turrets for feed;

a feed motion conversion mechanism provided between said turrets for feed and said feed bars to convert the rocking rotation of said each turret for feed into the feed motion of said each feed bar; and a clamp motion conversion mechanism provided between said turrets for clamp and said feed bars to convert the rocking rotation of said each turret for clamp into the clamp motion of said each feed bar;

wherein said cam shape for feed is so set as to stop said turrets for feed during the rocking rotations of said turrets for clamp, and said cam shape for clamp is so set as to stop said turrets for clamp during the rocking rotations of said turrets for feed;

said feed motion conversion mechanism comprises a pair of moving tables individually mounted on said each feed bar, grooves for feed formed in said each moving table along the direction of said feed bars moving close to and away from each other, rocking arms for feed provided on said each turret for feed, and sliders provided on said each rocking arm for feed and disposed slidably in said each groove for feed;

said clamp motion conversion mechanism comprises said pair of moving tables, grooves for clamp formed in said each moving table along a direction orthogonal to the direction of said grooves for feed, rocking arms for clamp provided on said each turret for clamp, and sliders provided on said each rocking arm for clamp and disposed slidably in said each groove for clamp;

each of said feed bars is provided with a plurality of clamp pawls for clamping a work in opposed portions opposed to each other, said clamp pawls located at fixed intervals corresponding to the rocking rotational angle of said turrets for feed; and said work is clamped by said each clamp pawl in the clamp motion of said feed bars, and said clamped work is carried by the feed motion of said feed bars.

12. A carrier apparatus comprising:

an input shaft in which a rotational driving force is input from a mechanical apparatus to which said carrier apparatus is applied;

a pair of feed bars arranged in parallel with each other, capable of being reciprocated in a direction of moving close to and away from each other and in a direction orthogonal thereto, and each feed bar carrying out a rectangular motion;

one cam for clamp coaxially provided on said input shaft integrally rotatably and being formed with a cam shape with a point symmetry of 180-degree angles around a rotational axis thereof;

two cams for feed coaxially provided on said input shaft integrally rotatably and being formed with each of cam shapes with a point symmetry of 180-degree angles around a rotational axis thereof;

two turrets for clamp engaged at a symmetrical position of 180-degree angles with said cam for clamp with the latter sandwiched therebetween, and converting the rotation of said input shaft into the rocking rotations;

four turrets for feed engaged at a symmetrical position of 180-degree angle with said each cam for feed with the latter sandwiched therebetween, and converting the rotation of said input shaft into the rocking rotations in a direction orthogonal to the direction of the rocking rotation of said turrets for clamp;

a clamp motion conversion mechanism provided between said turrets for clamp and said feed bars to convert the rocking rotation of said each turret for clamp into the clamp motion of said each feed bar; and a feed motion conversion mechanisms provided between said turrets for feed and said feed bars to convert the rocking rotation of said each turret for feed into the feed motion of said each feed bar;

wherein said cam shape for feed is so set as to stop said turrets for feed during the rocking rotations of said turrets for clamp, and said cam shape for clamp is so set as to stop said turrets for clamp during the rocking rotations of said turrets for feed;

said feed motion conversion mechanism comprises a pair of moving tables individually mounted on said each feed bar, grooves for feed formed in said each moving table along the direction of said feed bars moving close to and away from each other, rocking arms for feed provided on said each turret for feed, and sliders provided on said each rocking arm for feed and disposed slidably in said each groove for feed;

said clamp motion conversion mechanism comprises said pair of moving tables, grooves for clamp formed in said each moving table along a direction orthogonal to the direction of said grooves for feed, rocking arms for clamp provided on said each turret for clamp, and sliders provided on said each rocking arm for clamp and disposed slidably in said each groove for clamp;

each of said feed bars is provided with a plurality of clamp pawls for clamping a work in opposed portions opposed to each other, said clamp pawls located at fixed intervals corresponding to the rocking rotational angle of said turrets for feed; and said work is clamped by said each clamp pawl in the clamp motion of said feed bars, and said clamped work is carried by the feed motion of said feed bars.

* * * * *